(12) United States Patent
Kim et al.

(10) Patent No.: US 12,724,633 B2
(45) Date of Patent: Sep. 1, 2026

(54) STORAGE CONTROLLER AND STORAGE DEVICE

(71) Applicant: SAMSUNG ELECTRONICS CO., LTD., Suwon-si (KR)

(72) Inventors: Chan Ha Kim, Hwaseong-si (KR); Han Kyoo Lee, Suwon-si (KR); Gyeong Min Nam, Yongin-si (KR); Seung Ryong Jang, Yangpyeong-gun (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 707 days.

(21) Appl. No.: 17/949,583

(22) Filed: Sep. 21, 2022

(65) Prior Publication Data

US 2023/0214258 A1 Jul. 6, 2023

(30) Foreign Application Priority Data

Jan. 6, 2022 (KR) ........................ 10-2022-0001885

(51) Int. Cl.
*G06N 20/00* (2019.01)
*G06F 9/48* (2006.01)
(Continued)

(52) U.S. Cl.
CPC ............ *G06F 9/4881* (2013.01); *G06F 9/546* (2013.01); *G06F 18/217* (2023.01); *G06N 20/00* (2019.01)

(58) Field of Classification Search
CPC ...... G06F 9/4881; G06F 18/217; G06F 9/546; G06F 13/1668; G06F 13/1642;
(Continued)

(56) References Cited

U.S. PATENT DOCUMENTS 9,298,376 B2 3/2016 Colgrove et al.
10,901,793 B2 1/2021 Craig et al.
(Continued)

FOREIGN PATENT DOCUMENTS

KR 10-2019-0043411 A 4/2019
KR 10-2021-0031220 A 3/2021

OTHER PUBLICATIONS

Communication issued on Nov. 26, 2025 by the Korean Intellectual Property Office for Korean Patent Application No. 10-2022-0001885.

*Primary Examiner* — Aimee Li
*Assistant Examiner* — An-An Ngoc Nguyen
(74) *Attorney, Agent, or Firm* — Sughrue Mion, PLLC

(57) ABSTRACT

A storage controller, including a processor configured to perform a plurality of tasks; and a scheduling module configured to schedule the plurality of tasks through reinforcement learning, and provide a scheduling result to the processor, wherein the scheduling module includes: a resource analysis module configured to analyze a usage history and a usage status of a resource; an access pattern analysis module configured to analyze an access pattern; a queue analysis module configured to analyze information included in a queue; and a performance analysis module configured to analyze a task execution result, wherein the scheduling module is further configured to perform the reinforcement learning using state information and reward information, and wherein the state information and the reward information are determined based on the performing of the plurality of tasks.

12 Claims, 12 Drawing Sheets

(51) Int. Cl.

| | |
|---|---|
| ***G06F 9/54*** | (2006.01) |
| ***G06F 13/18*** | (2006.01) |
| ***G06F 18/21*** | (2023.01) |
| ***G06N 3/08*** | (2023.01) |

(58) Field of Classification Search
CPC ...... G06F 13/18; G06F 3/0659; G06F 3/0604; G06F 3/0653; G06N 20/00
See application file for complete search history.

(56) References Cited

U.S. PATENT DOCUMENTS

| | | | | |
|---|---|---|---|---|
| 10,963,394 | B2 | 3/2021 | Kachare et al. | |
| 11,010,314 | B2 | 5/2021 | Therene et al. | |
| 11,275,509 | B1 * | 3/2022 | Colgrove | G06F 11/1076 |
| 2014/0040855 | A1 * | 2/2014 | Wang | G06F 30/327 717/107 |
| 2018/0246758 | A1 * | 8/2018 | Cardonha | G06Q 10/0631 |
| 2018/0260700 | A1 * | 9/2018 | Nagaraja | G06N 3/044 |
| 2019/0073224 | A1 * | 3/2019 | Tian | G06F 11/3065 |
| 2019/0114078 | A1 | 4/2019 | Oh | |
| 2020/0257968 | A1 * | 8/2020 | Mitra | G06N 3/006 |
| 2021/0072901 | A1 | 3/2021 | Kale et al. | |
| 2021/0182190 | A1 * | 6/2021 | Gao | G06F 12/0246 |
| 2021/0255799 | A1 | 8/2021 | Kale et al. | |
| 2022/0007382 | A1 * | 1/2022 | Anand | H04W 72/12 |
| 2022/0086518 | A1 * | 3/2022 | Vikramaratne | H04L 63/102 |

* cited by examiner

FIG. 2

STORAGE CONTROLLER AND STORAGE DEVICE

CROSS-REFERENCE TO RELATED APPLICATION

This application is based on and claims priority under 35 U.S.C. § 119 to Korean Patent Application No. 10-2022-0001885 filed on Jan. 6, 2022 in the Korean Intellectual Property Office, the disclosure of which is incorporated by reference herein in its entirety.

BACKGROUND

Technical Field

The disclosure relates to a storage controller and a storage device.

Description of Related Art

As the number of functions implemented in a semiconductor device increases, the number of internal modules included in a semiconductor device is also increasing. As the number of internal modules included in a semiconductor device increases, complexity of a bus or interconnect, which connects a plurality of modules, increases. As the complexity of the bus or interconnect increases, scheduling of adjusting the order of tasks based on priority within the bus or interconnect becomes difficult. Therefore, instead of consistent scheduling, scheduling that considers statuses of internal modules at the time of executing tasks is required for each task.

SUMMARY

Provided is a storage controller having improved performance.

Also provided is a storage device having improved performance.

In accordance with an aspect of the disclosure, a storage controller includes a processor configured to perform a plurality of tasks based on a command received from a host; and a scheduling module configured to schedule the plurality of tasks through reinforcement learning, and provide a scheduling result to the processor, wherein the scheduling module includes: a resource analysis module configured to analyze a usage history and a usage status of a resource used for the plurality of tasks; an access pattern analysis module configured to analyze an access pattern corresponding to the plurality of tasks; a queue analysis module configured to analyze information included in a queue according to the command provided from the host; and a performance analysis module configured to analyze a task execution result of the processor, wherein the scheduling module is further configured to perform the reinforcement learning using state information and reward information, and wherein the state information and the reward information are determined based on the performing of the plurality of tasks.

In accordance with an aspect of the disclosure, a storage device includes a non-volatile memory; and a storage controller configured to perform a plurality of tasks corresponding to the non-volatile memory based on a command received from an outside of the storage device, wherein the storage controller includes: a machine learning module configured to generate a scheduling result, in which a priority of the plurality of tasks are determined, by performing reinforcement learning based on state information and reward information, wherein the state information and the reward information are determined by performing the plurality of tasks; a resource analysis module configured to analyze a usage history and a usage status of a resource used for the plurality of tasks; an access pattern analysis module configured to analyze an access pattern corresponding to the plurality of tasks; and a queue analysis module configured to analyze information included in a queue according to the command, and wherein the usage history, the usage status, the access pattern and the information included in the queue are provided to the machine learning module as the state information.

In accordance with an aspect of the disclosure, a storage device includes a non-volatile memory; and a storage controller configured to perform a plurality of tasks corresponding to the non-volatile memory based on a command received from an outside of the storage controller, wherein the storage controller is configured to: obtain state information including a usage history and a usage status of a resource used for the plurality of tasks, an access pattern performed for the plurality of tasks and information included in a queue corresponding to the command, perform reinforcement learning using an execution result corresponding to the plurality of tasks as reward information, and perform scheduling by determining a priority of the plurality of tasks in accordance with a result of the reinforcement learning.

In accordance with an aspect of the disclosure, a storage device includes a non-volatile memory; and at least one processor configured to: receive a command corresponding to a plurality of tasks, determine a priority of the plurality of tasks by performing reinforcement learning based on state information of resources and reward information corresponding to an execution result corresponding to the plurality of tasks, and perform the plurality of tasks according to the determined priority, wherein the state information includes a usage history and a usage status of a resource used for the plurality of tasks, an access pattern corresponding to the plurality of tasks, and information included in a queue according to the command, wherein the reward information includes at least one from among an amount of time corresponding to the plurality of tasks, a latency time corresponding to the plurality of tasks, and a quality of service corresponding to the plurality of tasks, and wherein the state information and the reward information are updated as the plurality of tasks are performed.

The objects of the present disclosure are not limited to those mentioned above and additional objects of the present disclosure, which are not mentioned herein, will be clearly understood by those skilled in the art from the following description of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a view illustrating a storage controller and a non-volatile memory of a storage device of FIG. 1, according to an embodiment;

DETAILED DESCRIPTION

Figure 1:
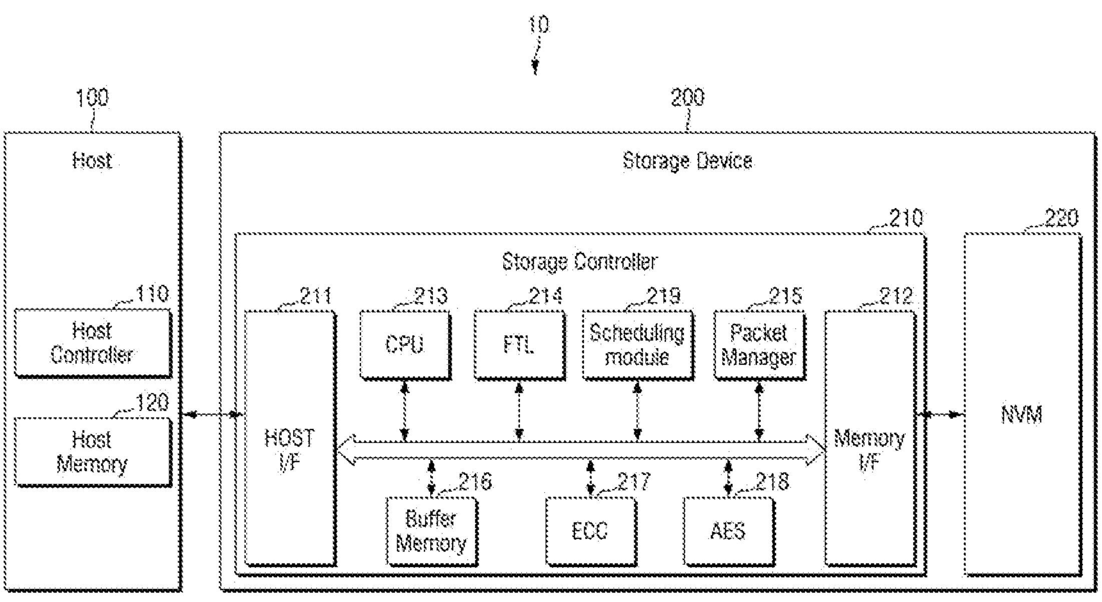
FIG. 1 is a view illustrating a storage device according to an embodiment.

Hereinafter, embodiments according to the technical spirits of the present disclosure will be described with reference to the accompanying drawings.

As is traditional in the field, embodiments may be described and illustrated in terms of blocks which carry out a described function or functions. These blocks, as shown in the drawings, which may be referred to herein as units or modules or the like, or by names such as device, circuit, receiver, interconnect, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Figure 2:
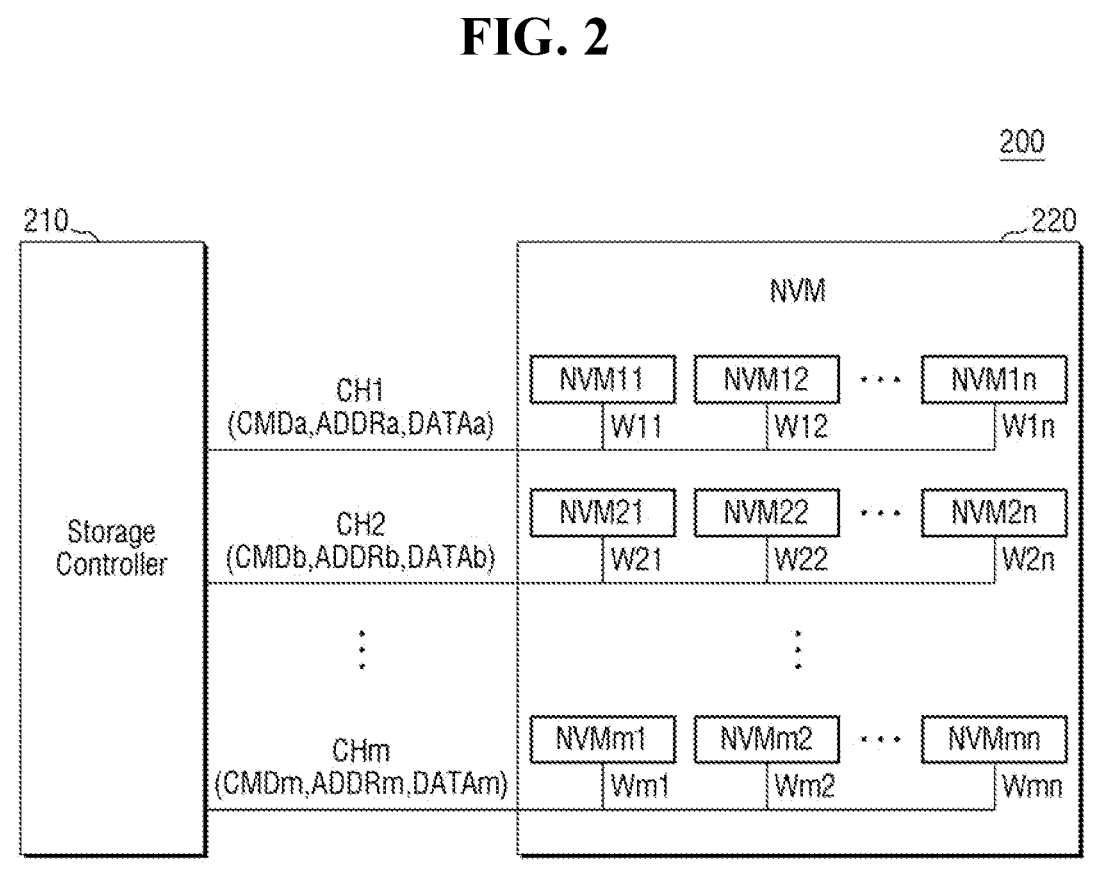
Figure 3:
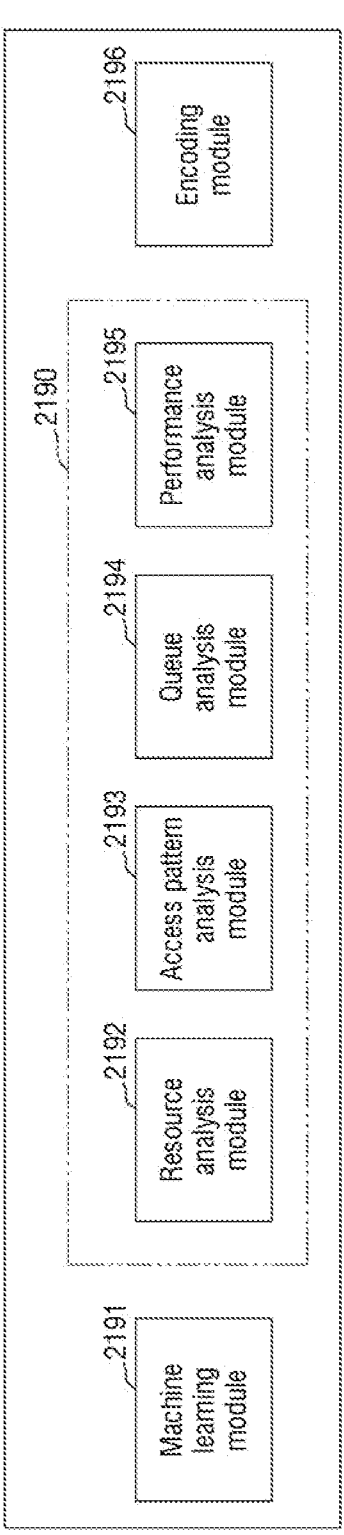
FIG. 3 is a view illustrating a scheduling module according to an embodiment.
Figure 4:
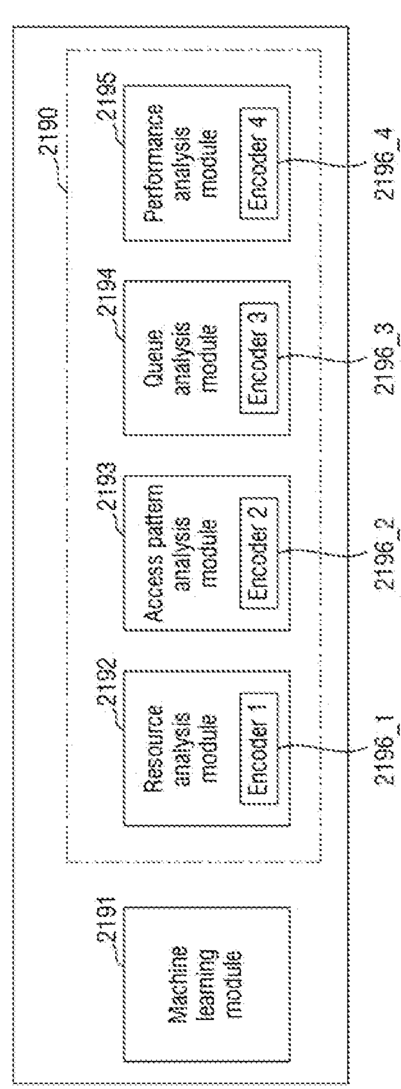
FIG. 4 is a view illustrating a scheduling module according to an embodiment.

FIG. 1 is a view illustrating a storage device according to some embodiments of the present disclosure. FIG. 2 is a view illustrating a storage controller and a non-volatile memory of a storage device of FIG. 1, according to embodiments. FIG. 3 is a view illustrating a scheduling module according to some embodiments of the present disclosure. FIG. 4 is a view illustrating a scheduling module according to some other embodiments of the present disclosure.

Referring to FIGS. 1 to 4, a memory system 10 may include a host device 100 and a storage device 200. Also, the storage device 200 may include a storage controller 210 and a non-volatile memory (NVM) 220. In some embodiments, the host device 100 may include a host controller 110 and a host memory 120. The host memory 120 may serve as a buffer memory for temporarily storing data to be transmitted to the storage device 200 or data transmitted from the storage device 200.

The storage device 200 may include storage media for storing data in accordance with a request from the host device 100. As an example, the storage device 200 may include at least one of a solid state drive (SSD), an embedded memory, or a detachable external memory. When the storage device 200 is the SSD, the storage device 200 may be a device that complies with a non-volatile memory express (NVMe) standard.

When the storage device 200 is the embedded memory or the external memory, the storage device 200 may be a device that complies with a universal flash storage (UFS) standard or an embedded multi-media card (eMMC) standard. Each of the host device 100 and the storage device 200 may generate and transmit packets according to a standard protocol that is employed.

When the non-volatile memory 220 of the storage device 200 includes a flash memory, the flash memory may include a 2-dimensional (2D) NAND memory array or a 3-dimensional (3D) NAND memory array, which may be referred to as a vertical NAND (VNAND) memory array. As another example, the storage device 200 may include other various types of non-volatile memories. For example, a magnetic random access memory (MRAM), a spin-transfer torque MRAM, a Conductive Bridging RAM (CBRAM), a Ferroelectric RAM (FeRAM), a Phase RAM (PRAM), a Resistive RAM and other various types of memories may be applied to the storage device 200.

Referring to FIG. 2, the storage device 200 may include a non-volatile memory 220 and a storage controller 210. The storage device 200 may support a plurality of channels CH1 to CHm, and the non-volatile memory 220 and the storage controller 210 may be connected with each other through the plurality of channels CH1 to CHm. For example, the storage device 200 may be implemented as a storage device such as a solid state drive (SSD).

The non-volatile memory 220 may include a plurality of banks NVM11 to NVMmn. Each of the banks NVM11 to NVMmn may be connected to one of the plurality of channels CH1 to CHm through a corresponding connection. In embodiments, a connection may be or include a connection structure, or a way. For example, the banks may be connected to the first channel CH1 through the connections W11 to W1*n*, and the banks NVM21 to NVM2*n* may be connected to the second channel CH2 through the connections W21 to W2*n*. In an exemplary embodiment, each of the banks NVM11 to NVMmn may be implemented in a random memory unit capable of operating in accordance with an individual command from the storage controller 210. For example, each of the banks NVM11 to NVMmn may be implemented as a chip or a die, however embodiments are not limited thereto.

The storage controller 210 may transmit and receive signals to and from the non-volatile memory 220 through the plurality of channels CH1 to CHm. For example, the storage controller 210 may transmit commands CMDa to CMDm, addresses ADDRa to ADDRm and data DATAa to DATAm to the non-volatile memory 220 through the channels CH1 to CHm, or may receive the data DATAa to DATAm from the non-volatile memory 220.

The storage controller 210 may select one of the banks connected to the corresponding channel through each channel, and may transmit and receive the selected bank and signals to and from the selected non-volatile memory. For example, the storage controller 210 may select the bank NVM11 of the banks NVM11 to NVM1*n* connected to the first channel CH1. The storage controller 210 may transmit the command CMDa, the address ADDRa and the data DATAa to the selected bank NVM11 through the first channel CH1, or may receive the data DATAa from the selected bank NVM11.

The storage controller 210 may transmit and receive signals to and from the non-volatile memory 220 in parallel through different channels. For example, the storage controller 210 may transmit the command CMDb to the non-volatile memory 220 through the second channel CH2 while transmitting the command CMDa to the non-volatile memory 220 through the first channel CH1. For example, the storage controller 210 may receive the data DATAb from the non-volatile memory 220 through the second channel CH2 while receiving the data DATAa from the non-volatile memory 220 through the first channel CH1.

The storage controller 210 may control the overall operation of the non-volatile memory 220. The storage controller 210 may transmit a signal to the channels CH1 to CHm to control each of the banks NVM11 to NVMmn connected to the channels CH1 to CHm. For example, the storage controller 210 may transmit the command CMDa and the address ADDRa to the first channel CH1 to control a selected one of the banks NVM11 to NVM1*n*.

Each of the banks NVM11 to NVMmn may operate under the control of the storage controller 210. For example, the bank NVM11 may program the data DATAa in accordance with the command CMDa, the address ADDRa and the data DATAa, which are provided to the first channel CH1. For example, the bank NVM21 may read the data DATAb in accordance with the command CMDb and the address ADDRb, which are provided to the second channel CH2, and may transmit the read data DATAb to the storage controller 210.

Although FIG. 2 shows that the non-volatile memory 220 performs communication with the storage controller 210 through m number of channels and includes n number of non-volatile memory devices to correspond to each channel, embodiments are not limited thereto, and various modifications may be made in the number of channels and the number of non-volatile memory devices connected to one channel.

In some embodiments, each of the host controller 110 and the host memory 120 may be implemented as a separate semiconductor chip. In some embodiments, the host controller 110 and the host memory 120 may be integrated into the same semiconductor chip. As an example, the host controller 110 may be any of a plurality of modules provided in an application processor, and the application processor may be implemented as a system on chip (SoC). In addition, the host memory 120 may be an embedded memory provided in the application processor, or may be a non-volatile memory or memory module disposed outside the application processor.

The host controller 110 may store data (e.g., write data) of a buffer region in the non-volatile memory 220, or may manage an operation of storing data (e.g., read data) of the non-volatile memory 220 in the buffer region.

The storage controller 210 may include a host interface 211, a memory interface 212 and a central processing unit (CPU) (hereinafter, referred to as 'processor') 213. The storage controller 210 may further include a flash translation layer (FTL) 214, a packet manager 215, a buffer memory 216, an error correction code (ECC) engine 217 and an advanced encryption standard (AES) engine 218.

The processor 213 may perform a plurality of tasks in accordance with a command provided from the host device 100. The processor 213 may perform the plurality of tasks in accordance with priority. The processor 213 may sequentially perform the plurality of tasks in accordance with a scheduling result provided from the scheduling module 219 in a first mode. In embodiments, in the first mode, the processor 213 may perform the plurality of tasks in accordance with scheduling inferred by machine learning in consideration of the entire status of the storage device 200 without following a predetermined rule of the storage controller 210, for example a predetermined or pre-set rule that is stored in the storage controller 210 in advance.

In a second mode, the processor 213 may perform the plurality of tasks in accordance with scheduling based on the predetermined rule of the storage controller 210 without following the scheduling result provided from the scheduling module 219. For example, the processor 213 may sequentially perform operations corresponding to an input queue. As another example, the processor 213 may first perform a task, which needs the least time, among the plurality of tasks.

The processor 213 may select one of the first mode and the second mode. In embodiments, the processor 213 may selectively perform the plurality of tasks in accordance with any one of the scheduling result provided from the scheduling module 219 and the predetermined rule of the storage controller 210.

The storage controller 210 may further include a working memory in which the FTL 214 is loaded, and the processor 213 may control data write and read operations for the non-volatile memory by executing the FTL 214.

The host interface 211 may transmit and receive packets to and from the host device 100. The packets transmitted from the host device 100 to the host interface 211 may include a command or data to be written in the non-volatile memory 220, and the packets transmitted from the host interface 211 to the host device 100 may include a response to the command or data read from the non-volatile memory 220.

The memory interface 212 may transmit the data to be written in the non-volatile memory 220 to the non-volatile memory 220 or may receive the data read from the non-volatile memory 220. Such a memory interface 212 may be implemented to comply with standard protocols such as Toggle or Open NAND Flash Interface (ONFI).

The FTL 214 may perform various functions such as address mapping, wear-leveling and garbage collection. The address mapping operation is an operation of changing a logical address received from the host device 100 to a physical address used to actually store data in the non-volatile memory 220. The wear-leveling is a technique for preventing excessive degradation of a specific block by allowing blocks in the non-volatile memory 220 to be used uniformly, and may exemplarily be implemented through firmware technology for balancing erase counts of physical blocks. The garbage collection is a technique for making sure of the available capacity in the non-volatile memory 220 by copying valid data of a block to a new block and then erasing the existing block.

The packet manager 215 may generate a packet according to a protocol of an interface negotiated with the host device 100, or may parse various kinds of information from the packet received from the host device 100.

The buffer memory 216 may temporarily store data to be written in the non-volatile memory 220 or data to be read from the non-volatile memory 220. In embodiments, the buffer memory 216 may be provided in the storage controller 210, or may be disposed outside the storage controller 210.

The buffer memory 216 may store scheduling environment information about a plurality of tasks and scheduling result information generated by the scheduling module 219 when the storage controller 210 performs the plurality of tasks for the non-volatile memory 220. The buffer memory

216 may also store state information or reward information provided by a data providing module 2190 to a machine learning module 2191.

In embodiments, the scheduling result information generated by the scheduling module 219 or the state information or reward information provided by the data providing module 2190 to the machine learning module 2191 may be stored in a separate memory not the buffer memory 216. For example, a separate memory for storing data used for scheduling the plurality of tasks may be included.

The ECC engine 217 may perform error detection and correction functions for the read data read from the non-volatile memory 220. For example, the ECC engine 217 may generate parity bits for write data to be written in the non-volatile memory 220, and the generated parity bits may be stored in the non-volatile memory 220 together with the write data. When reading the data from the non-volatile memory 220, the ECC engine 217 may correct an error of the read data by using the parity bits read from the non-volatile memory 220 together with the read data, and then may output the error-corrected read data.

The AES engine 218 may perform at least one of an encryption operation or a decryption operation for the data input to the storage controller 210 by using a symmetric-key algorithm.

Referring to FIG. 3, the scheduling module 219 may include a data providing module 2190, a machine learning module 2191 and an encoding module 2196. The scheduling module 219 may determine a priority of a plurality of tasks and then schedule the plurality of tasks through reinforcement learning. The scheduling module 219 may vary a period for scheduling a plurality of tasks through reinforcement learning in accordance with an operation mode. For example, in a third mode, the scheduling module 219 may schedule the plurality of tasks by performing reinforcement learning whenever there is a command of the memory system 10 for the plurality of tasks. As another example, in a fourth mode, the scheduling module 219 may schedule the plurality of tasks by performing reinforcement learning at a predetermined period even though there is no command of the memory system 10 for the plurality of tasks.

The data providing module 2190 may include a resource analysis module 2192, an access pattern analysis module 2193, a queue analysis module 2194 and a performance analysis module 2195. The data providing module 2190 may provide data used for machine learning performed by the machine learning module 2191.

The resource analysis module 2192 may analyze a usage history and usage status of a resource required for performing the task of the storage controller 210. The resource analysis module 2192 may provide information about the usage history and usage status of the resource to the machine learning module 2191. For example, the resource analysis module 2192 may provide the machine learning module 2191 with information about the usage history and usage status of the resource as state information used for the reinforcement learning of the machine learning module 2191.

The resource may refer to entire modules included in the storage device 200. For example, the resource may include a module used when the storage controller 210 performs a task. For example, the resource may include the non-volatile memory 220. As another example, the resource may include a buffer memory 216. In embodiments, the resource may refer to a module required when the storage controller 210 performs a particular task in response to the command received from the host device 100.

The resource analysis module 2192 may analyze the usage history and usage status of the module of the storage device 200, which are required when the storage controller 210 performs a particular task. For example, the resource analysis module 2192 may collect information about an address in which a particular one of the plurality of banks NVM11 to NVMmn included in the non-volatile memory stores data, and information about a ratio of data, which are stored in the particular one of the plurality of banks, with respect to a total capacity.

The access pattern analysis module 2193 may analyze an access pattern performed by the storage controller 210. The access pattern analysis module 2193 may provide the access pattern performed for the task of the storage controller 210 to the machine learning module 2191. For example, the access pattern analysis module 2193 may provide the machine learning module 2191 with the access pattern performed for the task of the storage controller 210 as state information used for reinforcement learning of the machine learning module 2191.

The access pattern analysis module 2193 may analyze an access pattern of the plurality of tasks before providing information about the access pattern to the machine learning module 2191. For example, the access pattern analysis module 2193 may analyze the access pattern of recent N tasks prior to providing information about the access pattern to the machine learning module 2191.

For example, the access pattern analysis module 2193 may analyze the access pattern performed for a particular task. For example, when the storage controller 210 performs a first task in response to a first command provided from the host device 100, and accesses the non-volatile memory 220 by using the processor 213, the FTL 214, the buffer memory 216 and the ECC engine 217 of the storage controller 210, the access pattern analysis module 2193 may collect the access pattern for the processor 213, the FTL 214, the buffer memory 216, the ECC engine 217, and the non-volatile memory 220 when performing the first task.

The queue analysis module 2194 may analyze the information included in the queue. For example, the queue analysis module 2194 may analyze the order in which a plurality of command elements included in the queue are disposed. As another example, the queue analysis module 2194 may analyze a type of a command included in the queue. As still another example, the queue analysis module 2194 may collect the arrival time of the queue. The queue analysis module 2194 may provide information included in the analyzed queue to the machine learning module 2191. For example, the queue analysis module 2194 may provide the information included in the analyzed queue to the machine learning module 2191 as state information used for reinforcement learning of the machine learning module 2191.

The performance analysis module 2195 may analyze the result according to execution of the task of the storage controller 210. The performance analysis module 2195 may analyze the task execution result of the processor 213 of the storage controller 210. For example, the performance analysis module 2195 may analyze the time required when the storage controller 210 performs the first task. As another example, the performance analysis module 2195 may analyze latency time of a particular task. As still another example, the performance analysis module 2195 may analyze a quality of service (QoS) for a command. The performance analysis module 2195 may provide the analyzed task execution result to the machine learning module 2191. For example, the performance analysis module 2195 may provide the analyzed task execution result to the machine learning module 2191 as reward information used for reinforcement learning of the machine learning module 2191.

The machine learning module 2191 may perform machine learning based on the data provided from the data providing module 2190. In some embodiments, the machine learning module 2191 may perform reinforcement learning. The machine learning module 2191 may receive state information and reward information from the data providing module 2190.

The machine learning module 2191 may receive information about the usage history and usage status of the resource from the resource analysis module 2192. The machine learning module 2191 may receive information about the access pattern from the access pattern analysis module 2193. The machine learning module 2191 may receive information included in the queue from the queue analysis module 2194. The machine learning module 2191 may receive information about the task execution result from the performance analysis module 2195.

The machine learning module 2191 may perform reinforcement learning by using information about the usage history and usage status of the resource, information about the access pattern, information included in the queue and information about the task execution result.

The reinforcement learning may be described as a concept of agent, action, environment information, state information and reward information. The reinforcement learning may be a learning method for selecting an action or an action order to maximize reward among actions capable of being selected by recognizing a current state by an agent defined in a random environment.

The machine learning module 2191 may use the information about the usage history and usage status of the resource, the information about the access pattern and the information included in the queue as state information of the reinforcement learning. The machine learning module 2191 may consider the information about the usage history and usage status of the resource, the information about the access pattern, and the information included in queue in reinforcement learning. In embodiments, the state information used by the machine learning module 2191 may include information determined by performing a plurality of tasks. For example, the information about the usage history and usage status of the resource, the information about the access pattern and the information included in the queue, which are used by the machine learning module 2191 as state information of reinforcement learning, may be determined based on the performance of a plurality of tasks by the storage device 200.

The information about the usage history and usage status of the resource, the information about the access pattern and the information included in the queue, which are used as state information, may include information determined based on the performance of a plurality of tasks by the storage device 200 before the machine learning module 2191 performs reinforcement learning. For example, when the storage device 200 performs the first task in accordance with the first access pattern, the machine learning module 2191 may use the first access pattern for the reinforcement learning for scheduling a plurality of tasks after the first task, as state information.

The machine learning module 2191 may use the information about the task execution result as reward information of the reinforcement learning. For example, the machine learning module may select an action to maximize the task execution result. In embodiments, the reward information used by the machine learning module 2191 may include information determined by performing a plurality of tasks. For example, the information about the task execution result, which is used by the machine learning module 2191 as the reward information of the reinforcement learning, may be determined by performing a plurality of tasks by the storage device 200.

The task execution result, which is used as the reward information, may include information determined based on the performance of a plurality of tasks by the storage device 200 before the machine learning module 2191 performs reinforcement learning. For example, in the case that a first time, for example a first amount of time, is required when the storage device 200 performs a first task, the machine learning module 2191, which uses the time required for the entire task as the reward information of the reinforcement learning, may use information about the first time for the reinforcement learning for scheduling a plurality of tasks after the first task, as the reward information.

The action selected by the machine learning module 2191 through the reinforcement learning may include ready action, running action, block action or yield action of the plurality of tasks. In embodiments, the action selected by the machine learning module 2191 through the reinforcement learning may include dequeuing a particular element included in a queue that indicates a plurality of tasks.

The machine learning module 2191 may determine priority of a task in consideration of an inner status of the storage device 200, such as the information about the usage history and usage status of the resource, the information about the access pattern, or the information included in the queue. The machine learning module 2191 may determine priority of a plurality of tasks to improve the task execution result of the storage controller 210 through repeated reinforcement learning. For example, when the machine learning module 2191 uses the time required for the entire task for the reinforcement learning as reward information, the machine learning module 2191 may be scheduled to preferentially perform a particular task so that the time required for the entire task is reduced. As another example, when the machine learning module 2191 uses the latency time of the task for reinforcement learning as reward information, the machine learning module 2191 may schedule the plurality of tasks to reduce the latency time of the task. For other example, when the machine learning module 2191 uses a quality of service (QoS) for the command for reinforcement learning as reward information, the machine learning module 2191 may schedule a plurality of tasks by determining priority to improve the QoS.

In some embodiments, the machine learning module 2191 may be implemented in firmware or software and driven in the storage device 200. In this case, the machine learning module 2191 may control the operation of the storage controller 210. In some embodiments, the machine learning module 2191 may be implemented in hardware and driven in the storage device 200. In this case, the machine learning module 2191 may be implemented in the form of, or implemented as or using, a separate machine learning processor and included in the storage device 200.

The encoding module 2196 may encode information used in the machine learning module 2191. For example, the encoding module 2196 may convert the data collected by the data providing module 2190 into data that may be applied to a model used for reinforcement learning by the machine learning module 2191.

For example, the encoding module 2196 may convert the information about usage history and usage status of the resource provided by the resource analysis module 2192 into a form that may be used by the machine learning module 2191 as state information in reinforcement learning. The encoding module 2196 may convert the access pattern provided by the access pattern analysis module 2193 into a form that may be used by the machine learning module 2191 as state information in reinforcement learning. The encoding module 2196 may convert the information included in the queue provided by the queue analysis module 2194 into a form that may be used by the machine learning module 2191 as state information in reinforcement learning. The encoding module 2196 may convert the information about the task execution result provided by the performance analysis module 2195 into a form that may be used by the machine learning module 2191 as state information in reinforcement learning.

Referring to FIG. 3, the encoding module 2196 may be implemented as a separate module from the data providing module 2190. The encoding module 2196 may receive the information about the usage history and usage status of the resource from the resource analysis module 2192, encode the information and provide the encoded information to the machine learning module 2191. The encoding module 2196 may receive the information about the access pattern from the access pattern analysis module 2193, encode the information and provide the encoded information to the machine learning module 2191. Likewise, the encoding module 2196 may receive the information included in the queue and the information about the task execution result from the queue analysis module 2194 and the performance analysis module 2195, encode the information and provide the encoded information to the machine learning module 2191.

Referring to FIG. 4, encoders 2196_1 to 2196_4 may be included in the data providing module 2190. The first encoder 2196_1 included in the resource analysis module 2192 may encode the information about the usage history and usage status of the resource and provide the encoded information to the machine learning module 2191. The second encoder 2196_2 included in the access pattern analysis module 2193 may encode the information about the access pattern and provide the encoded information to the machine learning module 2191. The third encoder 2196_3 included in the queue analysis module 2194 may encode the information included in the queue and provide the encoded information to the machine learning module 2191. The fourth encoder 2196_4 included in the performance analysis module 2195 may encode the information about the task execution result and provide the encoded information to the machine learning module 2191.

Figure 5:
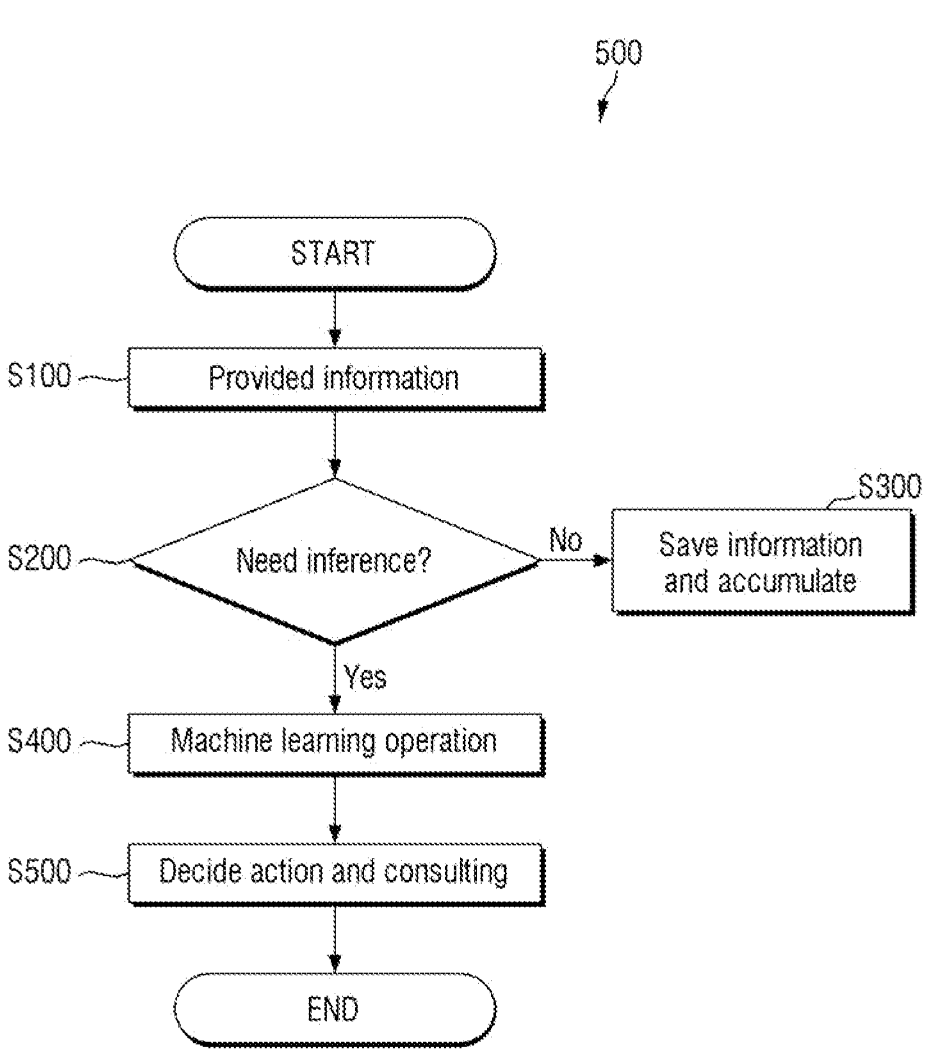
FIG. 5 is a flow chart illustrating an operation of a scheduling module according to an embodiment.

FIG. 5 is a flow chart illustrating process 500 of a scheduling module according to some embodiments of the present disclosure.

Referring to FIGS. 1 and 5, the scheduling module 219 receives information to schedule a plurality of tasks at operation S100. For example, the machine learning module 2191 of the scheduling module 219 may receive the information from the data providing module 2190. In some embodiments, the machine learning module 2191 may receive information used for machine learning from the resource analysis module 2192, the access pattern analysis module 2193, the queue analysis module 2194 and the performance analysis module 2195.

Subsequently, the scheduling module 219 determines whether inference is required, or for example determines whether inference is needed, or otherwise should be used, at operation S200. For example, when the scheduling module 219 receives a request for task scheduling consulting from the processor 213, the scheduling module 219 may determine that inference is required. In embodiments, the scheduling module 219 may determine that inference is required every predetermined period even though there is no request for task scheduling consulting from the processor 213.

When inference is not required, the scheduling module 219 stores and accumulates the collected information at operation S300. For example, when there is no request for task scheduling consulting from the processor 213, or in addition to a predetermined period at which inference is required, the scheduling module 219 may simply store and accumulate the collected information without performing scheduling through machine learning. In embodiments, after operation S300 is performed, the process 500 may return to a start of the process 500, may proceed to an end of the process 500, or may return to any other operation, for example operation S100.

Based on determining at operation S200 that inference is required, for example when the scheduling module 219 receives a request for task scheduling consulting from the processor 213, when the predetermined period occurs, a machine learning operation is performed at operation S400. For example, the machine learning module 2191 may perform reinforcement learning by using the data provided from the resource analysis module 2192, the access pattern analysis module 2193, the queue analysis module 2194 and the performance analysis module 2195.

Subsequently, the scheduling module 219 determines an action and consults for the determined action at operation S500. For example, the machine learning module 2191 may determine priority of the plurality of tasks through reinforcement learning to form a scheduling result for the plurality of tasks, and may provide the scheduling result to the processor 213.

Figure 6:
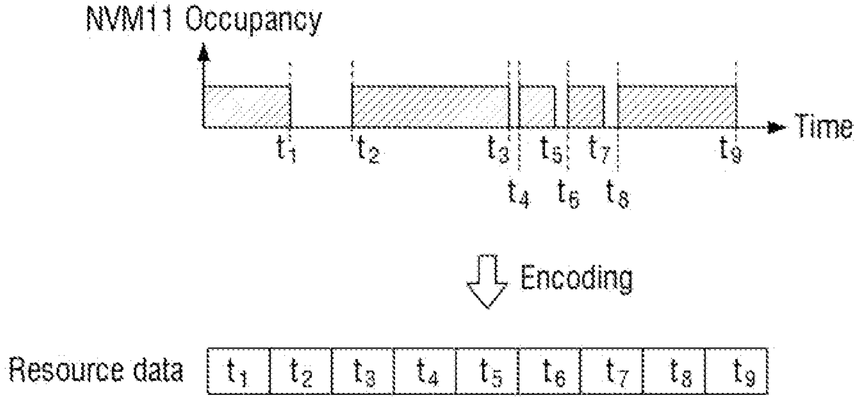
FIG. 6 is an exemplary view illustrating an encoding operation according to an embodiment.

FIG. 6 is an exemplary view illustrating an encoding operation according to some embodiments of the present disclosure. An operation of an encoding module described with reference to FIG. 6 is an exemplary operation for description, and the operation of the encoding module is not limited thereto.

Referring to FIGS. 1 to 3 and 6, the encoding module 2196 of the scheduling module 219 may encode information about an occupancy history of the bank NVM11 of the non-volatile memory 220.

For example, the bank NVM11 may store data up to a first time t1, and may not store data from the first time t1 to a second time t2. In addition, the bank NVM11 may be in a state that data are stored during the time between the second time t2 and a third time t3, the time between a fourth time t4 and a fifth time t5, the time between a sixth time t6 and a seventh time t7, the time between an eighth time t8 and a ninth time t9.

As described above, the resource analysis module 2192 may analyze a history of data stored during the time between the first time t1 and the second time t2, the time between the second time t2 and the third time t3, the time between the fourth time t4 and the fifth time t5, the time between the sixth time t6 and the seventh time t7 and the time between the eighth time t8 and the ninth time t9 and provide the analyzed history to the encoding module 2196.

The encoding module 2196 may encode information about the occupancy history and occupancy status of the bank NVM11, which are provided by the resource analysis module 2192 and convert the information into resource data. The resource data has a form that may be used by the machine learning module 2191 for machine learning. Embodiments are not limited thereto, and various modifications may be made in the form that the encoding module 2196 converts information, in accordance with embodiments.

Figure 7:
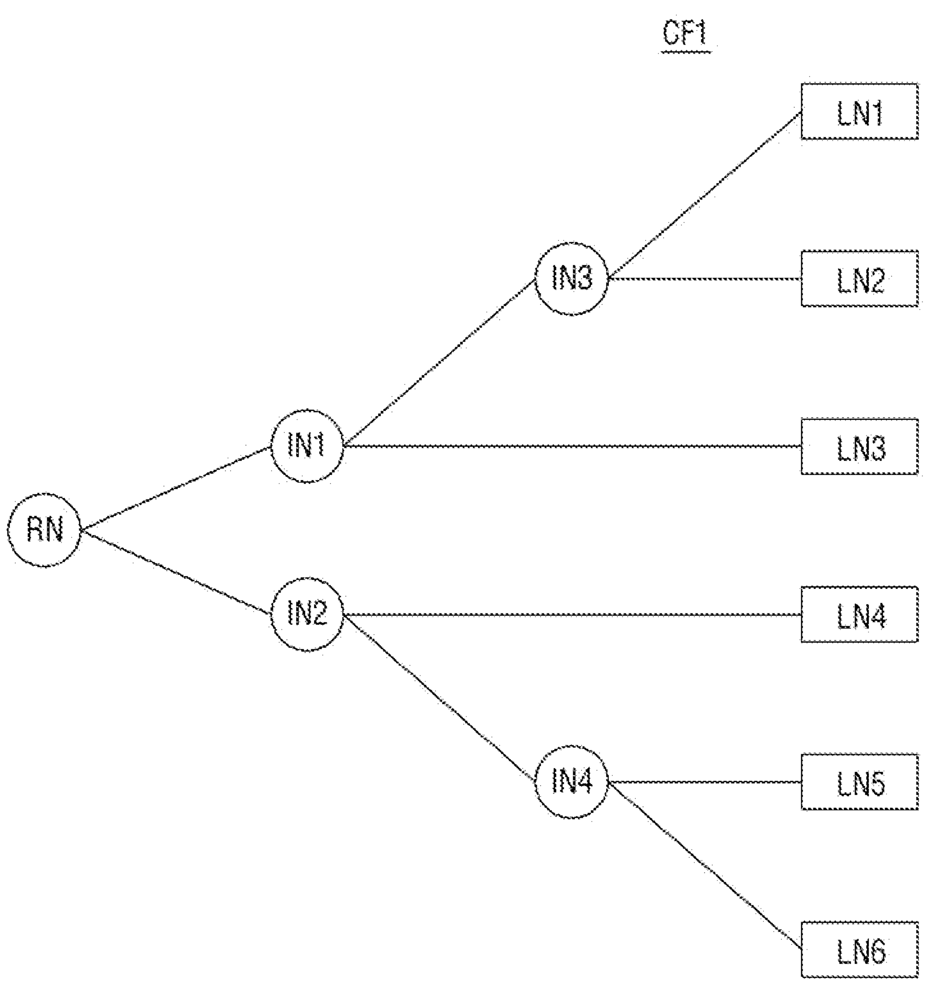
FIGS. 7 to 9 are exemplary views illustrating a model used by a machine learning module according to an embodiment.
Figure 8:
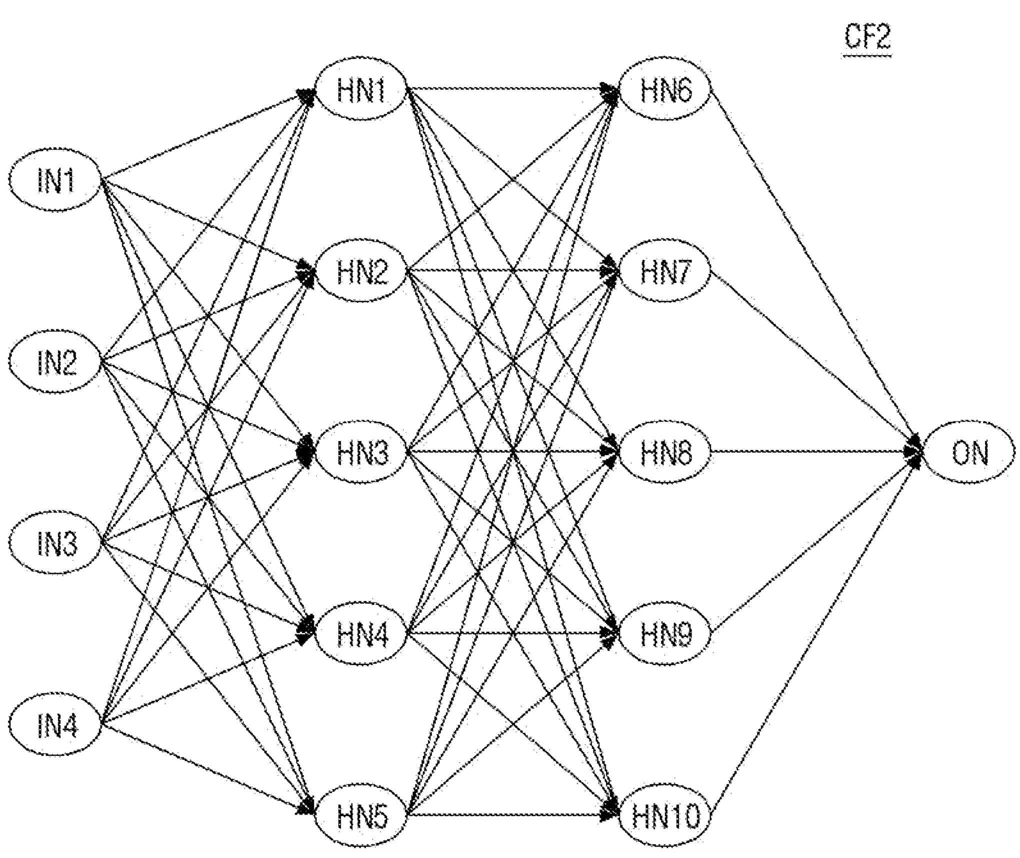
Figure 9:
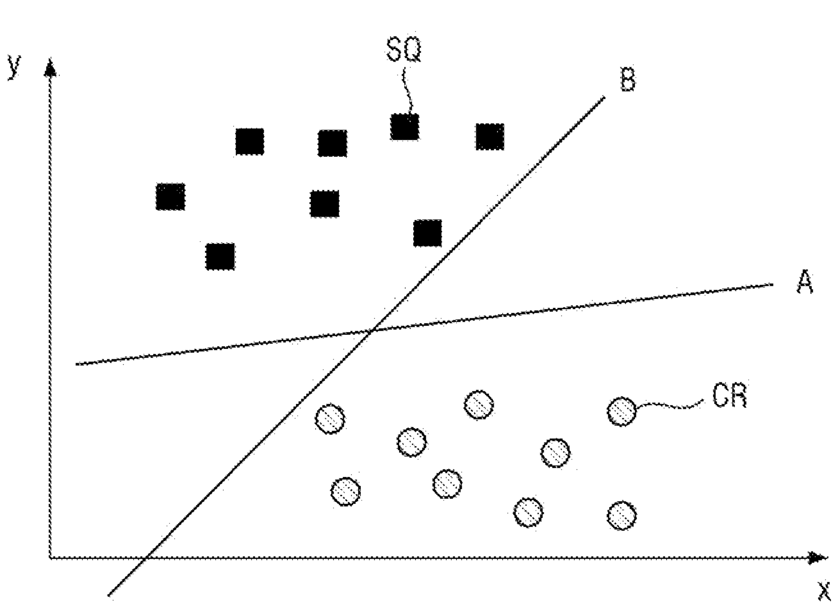

FIGS. 7 to 9 are exemplary views illustrating a model used by a machine learning module according to some embodiments.

Referring to FIGS. 1, 2 and 7, the machine learning module 2191 may use a first model CF1. The first model CF1 may be a decision tree.

The first model CF1 includes a root node RN, first to fourth internal nodes IN1 to IN4, and first to sixth leaf nodes LN1 to LN6. The root node RN, the first to fourth internal nodes IN1 to IN4 and the first to sixth leaf nodes LN1 to LN6 may be connected to one another through branches.

In each of the root node RN and the first to fourth internal nodes IN1 to IN4, a comparison of one of the scheduling result information may be performed. In accordance with the result of the comparison, one of a plurality of branches connected to each node may be selected. When another internal node is connected to the selected branch, a comparison of the other one of the scheduling result information in the internal node may be performed. When the leaf node is connected to the selected branch, a value of the leaf node may be acquired by a classification result.

When the storage device 200 according to some embodiments is sold after being manufactured, the first model CF1 may be loaded into the storage device 200. For example, the first model CF1 may be generated based on the scheduling result information collected from multiple users by a manufacturer of the storage device 200. The first model CF1 may be considered to be generated or updated by 'off-line' learning in view of the information already collected.

While the storage device 200 according to some embodiments is being sold and used by a user, the first model CF1 may continue to be updated by the scheduling result information of the user. Updating the first model CF1 may be performed by machine learning for updating the comparison value in which the scheduling result information is compared in each of the root node RN and the first to fourth internal nodes IN1 to IN4. After the storage device 200 is sold, the first model CF1 may be considered to be generated or updated by 'on-line' learning in view of updating the first model CF1 using real-time scheduling result information by the user.

Referring to FIGS. 1, 2 and 8, the machine learning module 2191 may use a second model CF2. The second model CF2 may be a neural network.

The second model CF2 may include first to fourth input nodes IN1 to IN4, first to tenth hidden nodes HN1 to HN10, and an output node ON. The number of input nodes, the number of hidden nodes, and the number of output nodes may be previously determined when a neural network is implemented.

The first to fourth input nodes IN1 to IN4 may form an input layer. The first to fifth hidden nodes HN1 to HN5 may form a first hidden layer. The sixth to tenth hidden nodes HN6 to HN10 may form a second hidden layer. The output node ON may form an output layer. The number of hidden layers may be previously determined when a neural network is configured.

The scheduling result information may be input to the first to fourth input nodes IN1 to IN4. Different types of scheduling result information may be input to different input nodes. The scheduling result information of each input node may be transferred to the first to fifth hidden nodes HN1 to HN5 of the first hidden layer with weights. The input of each of the first through fifth hidden nodes HN1 to HN5 may be transferred to the sixth through tenth hidden nodes HN6 to HN10 of the second hidden layer with weights. The inputs of the sixth through tenth hidden nodes HN6 to HN10 may be transferred to the output node ON with weights.

The machine learning may be performed by repeated updating of the weights in accordance with a difference between a value of the output node ON, which is acquired when the scheduling result information is input to the first to fourth input nodes IN1 to IN4, and scheduling result information acquired when a task is performed in accordance with an actual scheduling result.

The second model CF2 based on the neural network may be generated by off-line learning, and may be loaded into the storage device 200. As the user uses the storage device 200, the second model CF2 based on the neural network may be updated by on-line learning.

Referring to FIGS. 1, 2 and 9, the machine learning module 2191 may use a third model CF3. The third model CF3 may be a support vector machine.

Each of a horizontal axis 'x' and a vertical axis 'y' of the third model CF3 denote learning data. Shapes, for example a square shape and a circular shape, of samples distributed in the third model CF3 according to some embodiments may refer to information of different scheduling results.

Lines A and B may be used to classify square samples SQ and circular samples CR. However, considering the possibility of samples collected later, the line A may have a larger margin than the line B. The third model CF3 may select a classification criterion having a larger margin like the line A. The third model CF3 may have an initial classification criterion through off-line learning. As the user uses the storage device 100, the number of samples is increased, and the third model CF3 may update the classification criterion through on-line learning.

The models used for machine learning by the storage device 100 according to some embodiments are not limited to the above-described models. Recurrent Neural Networks (RNN), Long Short-Term Memory Models (LSTM), Generative Adversarial Nets (GAN), Variational Auto Encoder (VAE) and Regression Model may be used as the models.

Figure 10:
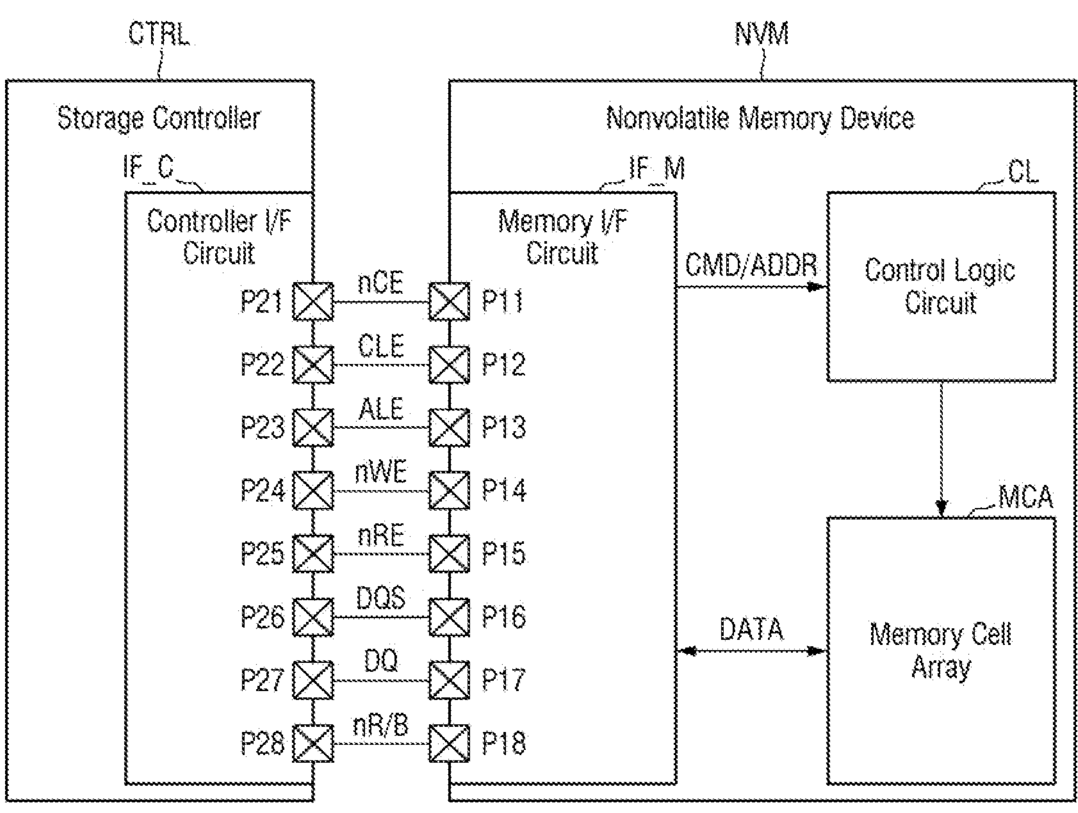
FIG. 10 is a view illustrating communication between a storage controller and a non-volatile memory according to an embodiment.

FIG. 10 is a view illustrating communication between a storage controller and a non-volatile memory according to some embodiments of the present disclosure.

Referring to FIG. 10, the storage device may include a storage controller CTRL and a non-volatile memory NVM. In one embodiment, one communication channel between the storage controller CTRL and the non-volatile memory NVM will be described with reference to FIG. 10, however embodiments are not limited thereto. The storage controller CTRL and other non-volatile memory devices may perform communication with each other through other channels (i.e., a plurality of channels) similar to the channel described with reference to FIG. 10.

The storage controller CTRL may include a first interface circuit IFC_1. In one embodiment, the first interface circuit IFC_1 may be a circuit included in the memory interface block described above.

The first interface circuit IFC_1 may include first to eighth signal pins P11 to P18. The storage controller CTRL may transmit various signals to the non-volatile memory NVM through the plurality of signal pins P11 to P18 of the first interface circuit IFC_1. For example, the storage controller CTRL may transmit a chip enable signal nCE to the non-volatile memory NVM through the first pin P11, transmit a command latch enable signal CLE to the non-volatile memory NVM through the second pin P12, transmit an address latch enable signal ALE to the non-volatile memory NVM through the third pin P13, transmit a write enable signal nWE to the non-volatile memory NVM through the fourth pin P14, transmit a read enable signal nRE to the non-volatile memory NVM through the fifth pin P15, transmit a data strobe signal DQS to the non-volatile memory NVM through the sixth pin P16, transmit a data signal DQ to the non-volatile memory NVM through the seventh pin P17 and receive a ready signal (or busy signal) nR/B from the non-volatile memory NVM through the eighth pin P18. In one embodiment, the seventh pin P17 may include a plurality of pins depending on a particular implementation.

The non-volatile memory NVM may include a second interface circuit IFC_2, a control logic circuit CL and a memory cell array MCA. The second interface circuit IFC_2 may include first to eighth signal pins P21 to P28. The second interface circuit IFC_2 may receive various signals from the storage controller CTRL through the first to eighth pins P21 to P28.

The second interface circuit IFC_2 may acquire a command CMD from the data signal DQ received at an enable period (e.g., high level state) of the command latch enable signal CLE based on toggle timings of the write enable signal nWE. The second interface circuit IFC_2 may acquire an address ADDR from the data signal DQ received at an enable period (e.g., high level state) of the address latch enable signal ALE based on the toggle timings of the write enable signal nWE.

In one embodiment, the write enable signal nWE may maintain a static state (e.g., high level or low level) and toggle between a high level and a low level. For example, the write enable signal nWE may toggle at a period where the command CMD or the address ADDR is transmitted. Therefore, the second interface circuit IFC_2 may acquire the command CMD or the address ADDR based on the toggle timings of the write enable signal nWE.

In the data DATA output operation of the non-volatile memory NVM, the second interface circuit IFC_2 may receive a read enable signal nRE that toggles through the fifth pin P15 before outputting the data DATA. The second interface circuit IFC_2 may generate a data strobe signal DQS that toggles based on toggling of the read enable signal nRE. For example, the second interface circuit IFC_2 may generate a data strobe signal DQS that starts to toggle after a predetermined delay (e.g., tDQSRE) based on a toggling start time of the read enable signal nRE. The second interface circuit IFC_2 may transmit the data signal DQ, which includes the data DATA, by being synchronized with the toggle timing of the data strobe signal DQS. Therefore, the data DATA may be aligned at the toggle timing of the data strobe signal DQS and transmitted to the storage controller 210.

In the data DATA input operation of non-volatile memory NVM, the memory interface circuit 310 may receive a data strobe signal DQS that toggles with the data signal DQ, which includes the data DATA, from the storage controller CTRL. The second interface circuit IFC_2 may acquire the data DATA from the data signal DQ based on the toggle timing of the data strobe signal DQS. For example, the second interface circuit IFC_2 may acquire the data DATA by sampling the data signal DQ at a rising edge and a falling edge of the data strobe signal DQS.

The second interface circuit IFC_2 may transmit the ready/busy output signal nR/B to the storage controller CTRL through the eighth pin P18. When the non-volatile memory NVM is in a busy state (for example when internal operations are performed), the second interface circuit IFC_2 may transmit the ready/busy output signal nR/B indicating a busy state to the storage controller CTRL. When the non-volatile memory NVM is in a ready state (for example when internal operations are not performed or are completed), the second interface circuit IFC_2 may transmit the ready/busy output signal nR/B indicating a ready state to the memory controller 400.

The control logic circuit CL may generally control various operations of the non-volatile memory NVM. The control logic circuit CL may receive the command/address CMD/ADDR acquired from the second interface circuit IFC_2. The control logic circuit CL may generate control signals for controlling other elements of the non-volatile memory NVM device in accordance with the received command/address CMD/ADDR.

The memory cell array MCA may store the data DATA acquired from the second interface circuit IFC_2 in accordance with the control of the control logic circuit CL. The memory cell array MCA may output the stored data DATA to the second interface circuit IFC_2 in accordance with the control of the control logic circuit CL.

The memory cell array MCA may include a plurality of memory cells. For example, the plurality of memory cells may be flash memory cells, however embodiments are not limited thereto. The memory cells may be resistive random access memory (RRAM) cells, ferroelectric random access memory (FRAM) cells, phase change random access memory (PRAM) cells, thyristor random access memory (TRAM) cells and magnetic random access memory (MRAM) cells.

Figure 11:
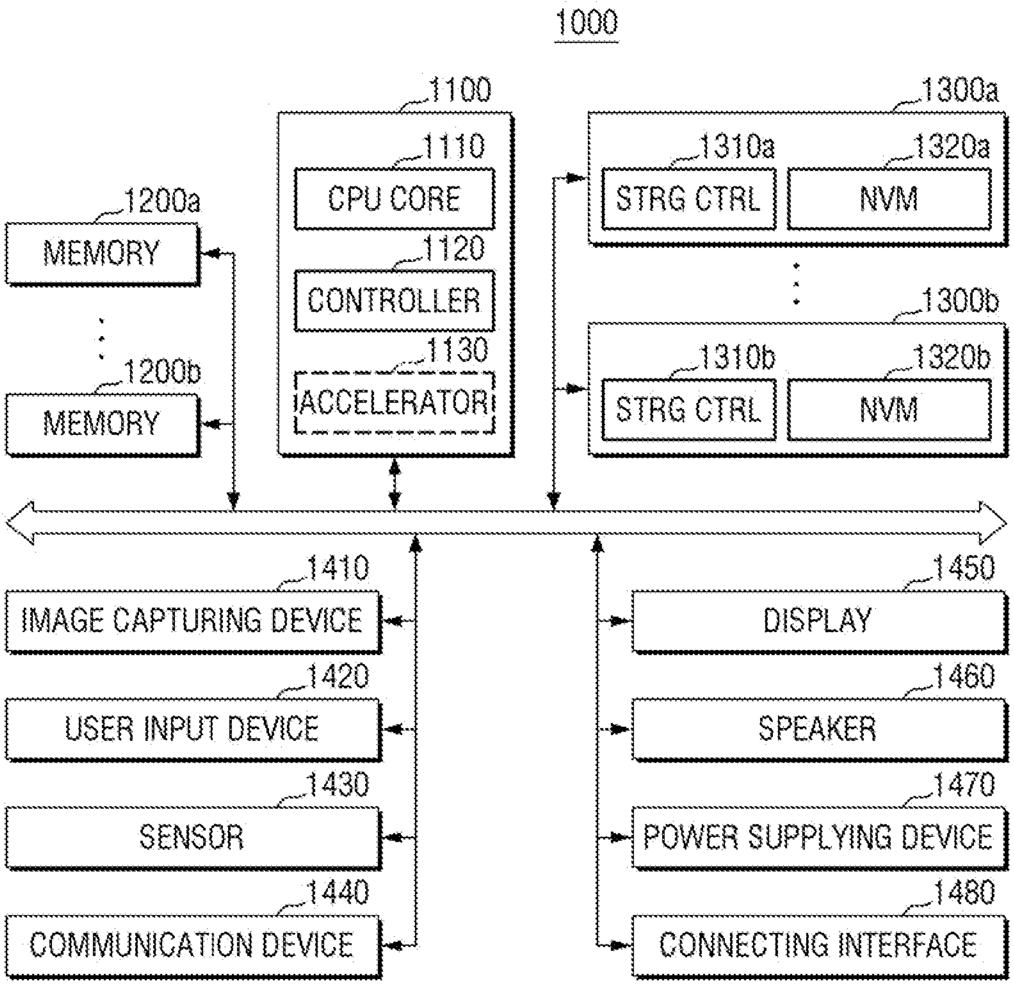
FIG. 11 is a view illustrating a system which includes a storage device is applied, according to an embodiment.

FIG. 11 is a view illustrating a system including a storage device in accordance with some embodiments of the present disclosure.

Referring to FIG. 11, the system 1000 may be a mobile system such as a mobile phone, a smart phone, a tablet personal computer (PC), a wearable device, a healthcare device, or an Internet of things (IOT) device. In one embodiment, the system 1000 is not limited to a mobile system and may be a personal computer, a laptop computer, a server, a media player, or automotive device such as navigator.

The system 1000 may include a main processor 1100, memories 1200*a* and 1200*b* and storage devices 1300*a* and 1300*b*, and may further include one or more of an image capturing device 1410, a user input device 1420, a sensor 1430, a communication device 1440, a display 1450, a speaker 1460, a power supplying device 1470 and a connecting interface 1480.

The main processor 1100 may control the overall operation of the system 1000, in more detail the operation of other elements included in the system 1000. The main processor 1100 may be implemented as a general purpose processor, a dedicated processor, or an application processor.

The main processor 1100 may include one or more CPU cores 1110, and may further include a controller 1120 for controlling the memories 1200*a* and 1200*b* and/or the storage devices 1300*a* and 1300*b*. In accordance with the embodiment, the main processor 1100 may further include an accelerator 1130 that is a dedicated circuit for high-speed data computation such as an artificial intelligence (AI) data computation. The accelerator 1130 may include a graphics processing unit (GPU), a neural network processing unit (NPU), and/or a data processing unit (DPU), and may be implemented as a separate chip physically independent from other elements of the main processor 1100.

The memories 1200*a* and 1200*b* may be used as main memory devices of the system 1000, and may include a volatile memory such as an SRAM and/or a DRAM but may also include a non-volatile memory such as a flash memory, a PRAM, and/or an RRAM. The memories 1200$a$ and 1200$b$ may be implemented in the same package as the main processor 1100. In one embodiment, the memories 1200$a$ and 1200$b$ may operate as the host memories described above.

The storage devices 1300$a$ and 1300$b$ may serve as non-volatile storage devices for storing data regardless of whether power is supplied, and may have a storage capacity relatively greater than that of the memories 1200$a$ and 1200$b$. The storage devices 1300$a$ and 1300$b$ may include storage controllers 1310$a$ and 1310$b$ and non-volatile memories (NVM) 1320$a$ and 1320$b$ for storing data under the control of the storage controllers 1310$a$ and 1310$b$. In embodiments, the non-volatile memories 1320$a$ and 1320$b$ may include a flash memory of a 2D structure or a VNAND structure, or may also include other types of non-volatile memories such as a PRAM and/or an RRAM.

The storage devices 1300$a$ and 1300$b$ may be included in the system 1000 in a physically separated state from the main processor 1100, and may be implemented in the same package as the main processor 1100. In addition, the storage devices 1300$a$ and 1300$b$ may be detachably coupled to other elements of the system 1000 through an interface, such as a connecting interface 1480, which will be described later, by having the same form as that of a solid state device (SSD) or a memory card. Such storage devices 1300$a$ and 1300$b$ may be, but are not limited to, devices to which standard protocols such as Universal Flash Storage (UFS), Embedded Multi-Media Card (eMMC), or Non-Volatile Memory Express (NVMe) are applied.

In some embodiments, the storage devices 1300$a$ and 1300$b$ may be configured to perform various computations under the control of main processor 1100, and may correspond to the storage devices described with reference to FIGS. 1 to 10. In some embodiments, in performing a plurality of tasks under the control of the main processor 1100, the storage devices 1300$a$ and 1300$b$ may perform a plurality of tasks in accordance with the scheduling result generated by a scheduling module, for example scheduling module 219 of FIG. 1. The storage devices 1300$a$ and 1300$b$ may be configured to execute or perform some of the functions executed by the accelerator 1130.

The image capturing device 1410 may capture a still image or a video, and may be a camera, a camcorder and/or a webcam.

The user input device 1420 may receive various types of data input from a user of the system 1000, and may be a touch pad, a keypad, a keyboard, a mouse and/or a microphone.

The sensor 1430 may sense various types of physical quantities that may be acquired from the outside of the system 1000 and convert the sensed physical quantities into an electrical signal. The sensor 1430 may be a temperature sensor, a pressure sensor, an illuminance sensor, a position sensor, an acceleration sensor, a biosensor and/or a gyroscope sensor.

The communication device 1440 may perform transmission and reception of signals between other devices outside the system 1000 in accordance with various communication protocols. Such a communication device 1440 may be implemented by including an antenna, a transceiver and/or a modem.

The display 1450 and the speaker 1460 may serve as output devices that output visual information and auditory information to a user of the system 1000, respectively.

The power supplying device 1470 may appropriately convert power supplied from an external power source and/or a battery embedded in the system 1000 to supply the power to each element of the system 1000.

The connecting interface 1480 may provide connection between the system 1000 and an external device connected to the system 1000 to exchange data with the system 1000. The connecting interface 1480 may be implemented in a variety of interface ways such as an Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVMe, IEEE 1394, universal serial bus (USB), Secure Digital (SD) card, Multi-Media Card (MMC), eMMC, UFS, embedded Universal Flash Storage (eUFS), and Compact Flash (CF) card interface.

Figure 12:
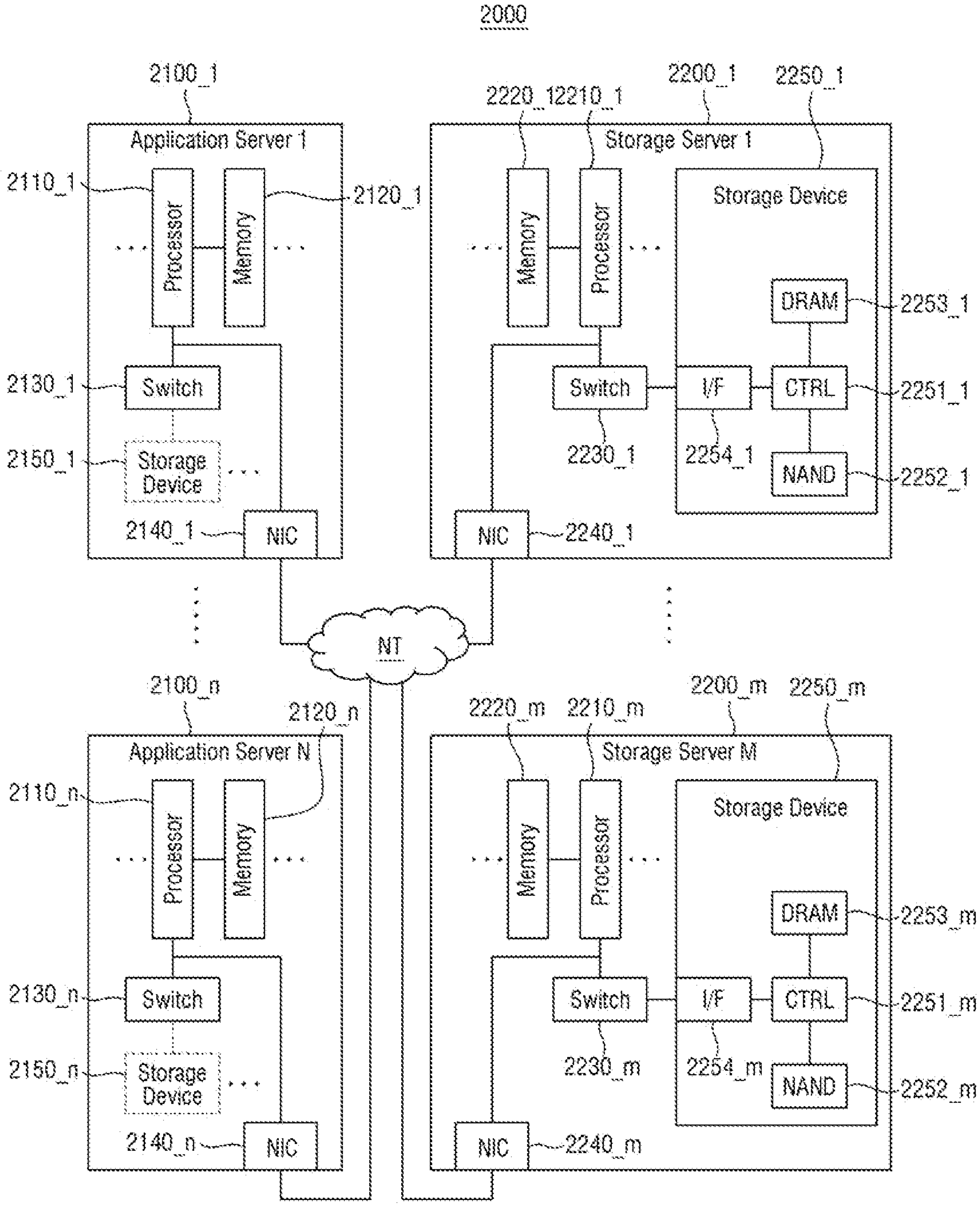
FIG. 12 is an exemplary block view illustrating a data center which includes a storage device according to an embodiment.

FIG. 12 is an exemplary block view illustrating a data center to which a storage device according to some embodiments of the present disclosure is applied, or for example a data center which includes a storage device according to embodiments.

Referring to FIG. 12, the data center 2000 manages various data and provides various services for various data, and may be referred to as a data storage center. The data center 2000 may be a system for a search engine or a database operation and may be a computing system used in a variety of engines. The data center 2000 may include a plurality of application servers 2100_1 to 2100_$n$ and a plurality of storage servers 2200_1 to 2200_$m$. Embodiments are not limited thereto, and various modifications may be made in the number of the plurality of application servers 2100_1 to 2100_$n$ and the number of the plurality of storage servers 2200_1 to 2200_$m$.

Hereinafter, for convenience of description, an example of the first storage server 2200_1 will be described. Each of the other storage servers 2200_2 to 2200_$m$ and the plurality of application servers 2100_1 to 2100_$n$ may have a structure similar to that of the first storage server 2200_1.

The first storage server 2200_1 may include a processor 2210_1, a memory 2220_1, a switch 2230_1, a network interface connector (NIC) 2240_1 and a storage device 2250_1. The processor 2210_1 may control the overall operation of the first storage server 2200_1. The memory 2220_1 may store various commands or data in accordance with the control of the processor 2210_1. The processor 2210_1 may be configured to execute or process various command languages or process data by accessing the memory 2220_1. In one embodiment, the memory 2220_1 may include at least one of a variety of types of memory devices such as Double Data Rate Synchronous Dynamic Random Access Memory (DDR SDRAM), High Bandwidth Memory (HBM), Hybrid Memory Cube (HMC), Dual In-line Memory Module (DIMM), Optane DIMM, or Non-Volatile DIMM (NVDIMM).

In one embodiment, various modifications may be made in the number of processors 2210_1 and the memories 2220_1 included in the first storage server 2200_1. In one embodiment, the processor 2210_1 and the memory 2220_1, which are included in the first storage server 2200_1, may be included in a processor-memory pair, and various modifications may be made in the number of processor-memory pairs included in the first storage server 2200_1. In one embodiment, the number of processors 2210_1 and the number of memories 2220_1, which are included in the first storage server 2200_1, may be different from each other. The processor 2210_1 may include a single core processor or a multi-core processor.

The switch 2230_1 may selectively connect the processor 2210_1 with the storage device 2250_1 or selectively connect the NIC 2240_1 with the storage device 2250_1 in accordance with the control of the processor 2210_1.

The NIC 2240_1 may be configured to connect the first storage server 2200_1 with the network NT. The NIC 2240_1 may include a network interface card, a network adapter, and the like. The NIC 2240_1 may be connected to the network NT by a wired interface, a wireless interface, a Bluetooth interface, an optical interface, and the like. The NIC 2240_1 may include an internal memory, a DSP, a host bus interface, and the like, and may be connected to the processor 2210_1 or the switch 2230_1 through the host bus interface. The host bus interface may include at least one of various interfaces such as Advanced Technology Attachment (ATA), Serial ATA (SATA), External SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), Secure Digital (SD) card, Multi-Media Card (MMC), embedded multi-media card (eMMC), Universal Flash Storage (UFS), embedded Universal Flash Storage (eUFS), and Compact Flash (CF) card interface. In one embodiment, the NIC 2240_1 may be integrated with at least one of the processor 2210_1, the switch 2230_1, or the storage device 2250_1.

The storage device 2250_1 may store data or output the stored data under the control of the processor 2210_1. The storage device 2250_1 may include a controller 2251_1, a non-volatile memory 2252_1, a DRAM 2253_1 and an interface 2254_1. In one embodiment, the storage device 2250_1 may further include a secure element (SE) for security or privacy. The storage device 2250_1 may include a scheduling module as described with reference to FIGS. 1 to 9, for example scheduling module 219 of FIG. 1.

The controller 2251_1 may control the overall operation of the storage device 2250_1. In one embodiment, the controller 2251_1 may include an SRAM. The controller 2251_1 may store data in the non-volatile memory 2252_1 or output the data stored in the non-volatile memory 2252_1 in response to signals received through the interface 2254_1. In one embodiment, the controller 2251_1 may be configured to control the non-volatile memory 2252_1 based on a toggle interface or an ONFI interface.

The DRAM 2253_1 may be configured to temporarily store data to be stored in the non-volatile memory 2252_1 or data read from the non-volatile memory 2252_1. The DRAM 2253_1 may be configured to store various data (e.g., metadata, mapping data, etc.) required to operate the controller 2251_1. The interface 2254_1 may provide a physical connection between the processor 2210_1, the switch 2230_1, or the NIC 2240_1 and the controller 2251_1. In one embodiment, the interface 2254_1 may be implemented in a direct attached storage (DAS) method that directly connects the storage device 2250_1 to a dedicated cable.

The above-described configurations of the first storage server 2200_1 are exemplary, and embodiments are not limited thereto. The configurations of the first storage server 2200_1 may be applied to each of the other storage servers or the plurality of application servers. In one embodiment, in each of the plurality of application servers 2100_1 to 2100_N, the storage device 2150_1 may be selectively omitted.

The plurality of application servers 2100_1 to **2100_*n* and the plurality of storage servers 2200_1 to 2200_*m* may communicate with each other through a network NT. The network NT may be implemented using a Fibre Channel (FC) or Ethernet. In this case, the FC is a medium used for relatively high-speed data transmission and may use an optical switch that provides high performance/high availability. The storage servers 2200_1 to 2200_*m*** may be provided as file storages, block storages or object storages in accordance with an access scheme of the network NT.

In one embodiment, the network NT may be a storage dedicated network such as a storage area network (SAN). For example, the SAN may be an FC-SAN that uses an FC network and is implemented in accordance with FC protocol (FCP). Alternatively, the SAN may be an IP-SAN that uses a TCP/IP network and is implemented in accordance with an SCSI over TCP/IP or Internet SCSI (iSCSI) protocol. In one embodiment, the network NT may be a general network such as a TCP/IP network. For example, the network NT may be implemented in accordance with protocols such as FC over Ethernet (FCoE), Network Attached Storage (NAS) and NVMe-oF (NVMe over Fabrics).

In one embodiment, at least one of the plurality of application servers 2100_1 to **2100_*n* may be configured to access at least another one of the plurality of application servers 2100_1 to 2100_*n* or at least one of the plurality of storage servers 2200_1 to 2200_*m*** through the network NT.

For example, the first application server 2100_1 may store data requested by a user or a client in at least one of the plurality of storage servers 2200_1 to **2200_*m* through the network NT. Alternatively, the first application server 2100_1 may acquire the data requested by the user or the client from at least one of the plurality of storage servers 2200_1 to 2200_*m* through the network NT. In this case, the first application server 2100_1** may be implemented as a web server or a database management system (DBMS).

In embodiments, the processor 2110_1 of the first application server 2100_1 may access the memory **2120_*n* or the storage device 2150_*n* of another application server (e.g., 2100_*n*) through the network NT. Alternatively, the processor 2110_1 of the first application server 2100_1 may access the memory 2220_1 or the storage device 2250_1 of the first storage server 2200_1 through the network NT. Therefore, the first application server 2100_1 may perform various operations for the data stored in the other application servers 2100_2 to 2100_*n* or the plurality of storage servers 2200_1 to 2200_*m*. For example, the first application server 2100_1 may execute or issue command languages for moving or copying data between the other application servers 2100_2 to 2100_*n* or the plurality of storage servers 2200_1 to 2200_*m*. In this case, the data to be moved or copied may be moved from the storage devices 2250_1 to 2250_*m* of the storage servers 2200_1 to 2200_*m* to the memories 2220_1 to 2220_*m* of the storage servers 2200_1 to 2200_*m*, or may be directly moved to the memories 2120_1 to 2120_*n* of the application servers 2100_1 to 2100_*n***. The data transferred through the network NT may be data encrypted for security or privacy.

In embodiments, the storage devices 2150_1 to **2170_*n* and 2250_1 to 2250_*n* may include the scheduling module described with reference to FIGS. 1 to 9, for example the scheduling module 219 of FIG. 1**.

Those skilled in the art will appreciate that many variations and modifications may be made to the embodiments discussed above without substantially departing from the principles of the present disclosure. Therefore, the embodiments discussed above are used in a generic and descriptive sense only, and not for purposes of limitation.

What is claimed is:

1. A storage controller comprising:

a processor configured to perform a plurality of tasks based on a command received from a host; and a scheduling module configured to schedule the plurality of tasks through reinforcement learning, and provide a scheduling result to the processor, wherein the scheduling module includes:

a resource analysis module configured to analyze a usage history and a usage status of a resource used for the plurality of tasks;

an access pattern analysis module configured to analyze an access pattern corresponding to the plurality of tasks;

a queue analysis module configured to analyze information included in a queue according to the command provided from the host; and a performance analysis module configured to analyze a task execution result of the processor, wherein the scheduling module is further configured to perform the reinforcement learning using state information and reward information, wherein the state information and the reward information are generated by the storage controller based on the performing of the plurality of tasks by the storage controller, and wherein the scheduling module further includes an encoding module configured to receive the state information and the reward information, and to convert the state information and the reward information into converted information in a format suitable for the reinforcement learning configured to be performed in a storage device, wherein the storage controller is configured to operate in a first mode, a second mode, a third mode, and a fourth mode, wherein, in the first mode, the storage controller performs the plurality of tasks according to the scheduling result and generates the scheduling result by performing the reinforcement learning based on the command, wherein, in the second mode, the storage controller performs the plurality of tasks according to a predetermined rule without following the scheduling result, wherein, in the third mode, the storage controller performs the reinforcement learning without performing the plurality of tasks according to the scheduling result, and wherein, in the fourth mode, the storage controller performs the reinforcement learning according to a predetermined period.

2. The storage controller of claim 1, wherein the scheduling module is further configured to:

use the usage history and the usage status, the access pattern, and the information included in the queue, as the state information, perform the reinforcement learning using the task execution result as the reward information, and generate the scheduling result by determining a priority of the plurality of tasks based on the reinforcement learning.

3. The storage controller of claim 1, wherein the scheduling module is further configured to perform the reinforcement learning according to a predetermined period.

4. The storage controller of claim 1, wherein the scheduling module is further configured to perform the reinforcement learning and to provide the scheduling result to the processor based on a request of the processor.

5. The storage controller of claim 1, further comprising a dedicated memory configured to store the scheduling result generated by the scheduling module, the state information, and the reward information.

6. The storage controller of claim 1, wherein the scheduling module further includes a machine learning module configured to perform the reinforcement learning and to generate the scheduling result.

7. A storage device comprising:

a non-volatile memory; and a storage controller configured to perform a plurality of tasks corresponding to the non-volatile memory based on a command received from an outside of the storage device, wherein the storage controller includes:

a machine learning module configured to generate a scheduling result, in which a priority of the plurality of tasks are determined, by performing reinforcement learning based on state information and reward information, wherein the state information and the reward information are generated by the storage controller by performing the plurality of tasks by the storage controller;

a resource analysis module configured to analyze a usage history and a usage status of a resource used for the plurality of tasks;

an access pattern analysis module configured to analyze an access pattern corresponding to the plurality of tasks; and a queue analysis module configured to analyze information included in a queue according to the command, and wherein the usage history, the usage status, the access pattern and the information included in the queue are provided to the machine learning module as the state information, and wherein the storage controller further includes an encoding module configured to receive the usage history, the usage status, the access pattern, and the information included in the queue, and to encode the usage history, the usage status, the access pattern, and the information included in the queue into encoded information suitable for the reinforcement learning configured to be performed in the storage device, wherein, based on the storage device operating in a first mode, the storage controller is configured to perform the plurality of tasks according to the scheduling result, and based on the storage device operating in a second mode, the storage controller is configured to perform the plurality of tasks according to a predetermined rule without following the scheduling result, and wherein, based on the storage device operating in the first mode, the storage controller is further configured to generate the scheduling result by performing the reinforcement learning based on the command, and based on the storage device operating in a fourth mode, the storage controller is configured to perform the reinforcement learning according to a predetermined period.

8. The storage device of claim 7, wherein the storage controller further includes a performance analysis module configured to:

analyze a task execution result of the storage controller, and provide the task execution result to the machine learning module as the reward information.

9. The storage device of claim 8, wherein the task execution result includes at least one from among a throughput of the storage controller measured in a unit of time, a latency of the command, or a quality of service (QoS) corresponding to the command.

10. A storage device comprising:

a non-volatile memory; and a storage controller configured to perform a plurality of tasks corresponding to the non-volatile memory based on a command received from an outside of the storage controller, wherein the storage controller is configured to:

generate state information including a usage history and a usage status of a resource used for the plurality of tasks, an access pattern performed for the plurality of tasks and information included in a queue corresponding to the command, based on performing the plurality of tasks by the storage controller, perform reinforcement learning using the state information and a reward information including an execution result corresponding to the plurality of tasks, and perform scheduling by determining a priority of the plurality of tasks in accordance with a result of the reinforcement learning, and wherein the storage controller includes an encoding module configured to receive the usage history, the usage status, the access pattern, the information included in the queue, and the execution result, and to convert the usage history, the usage status, the access pattern, the information included in the queue, and the execution result, into encoded information suitable for the reinforcement learning configured to be performed in the storage device, wherein the storage controller is configured to operate in a first mode, a second mode, a third mode, and a fourth mode, wherein, in the first mode, the storage controller performs the plurality of tasks according to the scheduling and generates a reinforcement learning result based on the command, wherein, in the second mode, the storage controller performs the plurality of tasks according to a predetermined rule without performing the scheduling based on the reinforcement learning result, wherein, in the third mode, the storage controller performs the reinforcement learning without performing the scheduling based on the reinforcement learning result, and wherein, in the fourth mode, the storage controller performs the reinforcement learning according to a predetermined period.

11. The storage device of claim 10, wherein the resource includes the non-volatile memory, and a plurality of modules included in the storage controller.

12. The storage device of claim 10, wherein the storage controller is further configured to perform the reinforcement learning according to a predetermined period.

* * * * *